(12) United States Patent
Kobayashi

(10) Patent No.: US 11,059,104 B2
(45) Date of Patent: Jul. 13, 2021

(54) CUTTING TOOL AND METHOD OF MANUFACTURING MACHINED PRODUCT

(71) Applicant: KYOCERA CORPORATION, Kyoto (JP)

(72) Inventor: Youji Kobayashi, Yasu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/480,312

(22) PCT Filed: Jan. 22, 2018

(86) PCT No.: PCT/JP2018/001771
§ 371 (c)(1),
(2) Date: Jul. 24, 2019

(87) PCT Pub. No.: WO2018/139401
PCT Pub. Date: Aug. 2, 2018

(65) Prior Publication Data
US 2020/0038962 A1 Feb. 6, 2020

(30) Foreign Application Priority Data

Jan. 24, 2017 (JP) .............................. JP2017-010093

(51) Int. Cl.
*B23B 27/10* (2006.01)
*B23C 5/28* (2006.01)
*B23B 27/04* (2006.01)

(52) U.S. Cl.
CPC .............. *B23B 27/10* (2013.01); *B23B 27/04* (2013.01)

(58) Field of Classification Search
CPC . B23B 27/10; B23B 27/1662; B23B 27/1681; B23B 2205/12; B23B 2200/0428
See application file for complete search history.

(56) References Cited

U.S. PATENT DOCUMENTS

| 4,072,438 A | * | 2/1978 | Powers | ................. B23B 27/007 |
| | | | | 407/103 |
| 5,388,487 A | * | 2/1995 | Danielsen | ............... B23B 29/04 |
| | | | | 279/2.08 |
| 5,718,156 A | * | 2/1998 | Lagrolet | ................. B23B 27/10 |
| | | | | 407/11 |

(Continued)

FOREIGN PATENT DOCUMENTS

JP H06254705 A 9/1994
WO WO-2017129414 A1 * 8/2017 ............. B23B 27/10

*Primary Examiner* — Nicole N Ramos
(74) *Attorney, Agent, or Firm* — Viering, Jentschura & Partner mbB

(57) ABSTRACT

A cutting tool may include a holder and a cutting insert. The cutting insert may include a ridge including a corner and a first side. The holder may include a first flow path extending along a first central axis, and a second flow path extending along a second central axis. A line obtained by extending the first central axis may be a first imaginary line, and a line obtained by extending the second central axis may be a second imaginary line, each of the first imaginary line and the second imaginary line is inclined downward. An intersection of the first imaginary line and the second imaginary line is located outside of the cutting insert in a plan view. The first imaginary line intersects with the ridge and the second imaginary line intersects with the first side at a side closer to the second end than the first imaginary line.

14 Claims, 10 Drawing Sheets

(56) References Cited

U.S. PATENT DOCUMENTS

| | | | |
|---|---|---|---|
| 2002/0127067 A1* | 9/2002 | Lagerberg | B23Q 11/10 |
| | | | 407/11 |
| 2007/0081867 A1* | 4/2007 | Murakami | B23B 29/02 |
| | | | 407/11 |
| 2016/0236281 A1* | 8/2016 | Kitagawa | B23B 27/10 |
| 2019/0030612 A1* | 1/2019 | Larsson | B23B 27/1662 |

* cited by examiner

CUTTING TOOL AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2018/001771 filed on Jan. 22, 2018, which claims priority to Japanese Application No. 2017-010093 filed on Jan. 24, 2017, which are entirely incorporated herein by reference.

TECHNICAL FIELD

The present disclosure relates to a cutting tool and a method of manufacturing a machined product.

BACKGROUND

As a cutting tool for use in a cutting process of a workpiece, such as metal, a cutting tool may be described in Japanese Unexamined Patent Publication No. 6-254705 (Patent document 1). The cutting tool described in Patent document 1 may include a tool body (holder) and a cutting insert and may be usable for a turning process, such as outer diameter milling.

The cutting tool described in Patent document 1 may include a plurality of injection ports. At least one of the plurality of injection ports may be directed to a front side of a chip and at least one of the rest may be directed to a rear side of the chip. The chip can be cooled by a cooling fluid (coolant) injected from the injection port.

In cases where the coolant is injected from both the front and rear sides of the chip, a stable curling of the chip may be hindered depending on individual injection angles. In particular, because the coolant to be injected from the injection port directed to the rear side of the chip goes toward the chip after generation, the chip moves violently and becomes unstable on the basis of a chip generation point, and entanglement or winding may occur.

SUMMARY

A cutting tool in a non-limiting aspect of the present disclosure may include a holder having a shape extending from a first end to a second end, and a cutting insert located at a side of the first end. The cutting insert may include a first surface and a cutting edge. The first surface may include a ridge including a corner and a first side extending from the corner toward the second end. The cutting edge may be located at the ridge. The holder may include a flow path including a first flow path and a second flow path. The first flow path may include a first outflow port, may be located above the cutting insert, and may extend along a first central axis. The second flow path may include a second outflow port, may be located above the cutting insert, and may extend along a second central axis. A straight line obtained by extending the first central axis from the first outflow port toward outside of the first flow path may be referred to as a first imaginary line, and a straight line obtained by extending the second central axis from the second outflow port toward outside of the second flow path may be referred to as a second imaginary line, the first imaginary line may be inclined downward as going away from the first outflow port, and the second imaginary line may be inclined downward as going away from the second outflow port. An intersection of the first imaginary line and the second imaginary line may be located outside of the cutting insert in a plan view of the first surface, and the first imaginary line may intersect with the ridge, and the second imaginary line may intersect with the first side at a side closer to the second end than the first imaginary line in the plan view.

A method of manufacturing a machined product in a non-limiting aspect of the present disclosure may include rotating a workpiece, bringing the cutting tool into contact with the workpiece being rotated, and separating the cutting tool from the workpiece.

BRIEF DESCRIPTION OF THE DRAWINGS

FIG. 2 is a side view illustrating a state in which a flow path or the like in the cutting tool illustrated in FIG. 1 is seen through;

DETAILED DESCRIPTION

<Cutting Tools>

Figure 1:
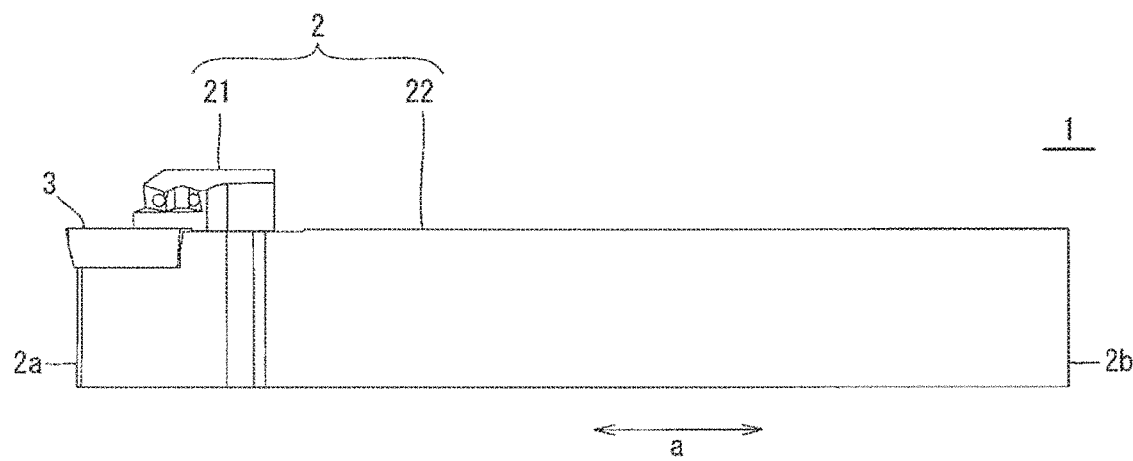
FIG. 1 is a side view illustrating a cutting tool in a non-limiting embodiment of the present disclosure.

The cutting tools in various non-limiting embodiments of the present disclosure are described in detail below with reference to the drawings. For the sake of description, each of the drawings referred to in the following illustrates, in a simplified form, only main members necessary for describing the non-limiting embodiments. Hence, the cutting tools of the present disclosure are capable of including any structural member not illustrated in the drawings referred to. Dimensions of the members in each of the drawings are not ones which faithfully represent dimensions of actual structural members and dimension ratios of these members. These points are also true for a method of manufacturing a machined product described later.

As illustrated in FIG. 1, the cutting tool 1 in a non-limiting embodiment may be a tool for use in a turning process. The cutting tool 1 may include a holder 2 and a cutting insert 3 (hereinafter also referred to as an "insert 3").

The holder 2 may have a shape extending from a first end 2a to a second end 2b. In other words, the holder 2 may have a columnar shape. The holder 2 in a non-limiting embodiment may have a quadrangular prism shape. The term "quadrangular prism shape" may be a concept that includes not only a strict quadrangular prism shape but also those including slight irregularities or curves. The shape of the holder 2 is not limited to the quadrangular prism shape.

The holder 2 in the non-limiting embodiments may include a head 21 located at a side of the first end 2a and a shank 22 located at a side of the second end 2b. The head 21 may be a portion that permits attachment of the insert 3. The shank 22 may be a portion designed to be held by a machine tool.

Figure 3:
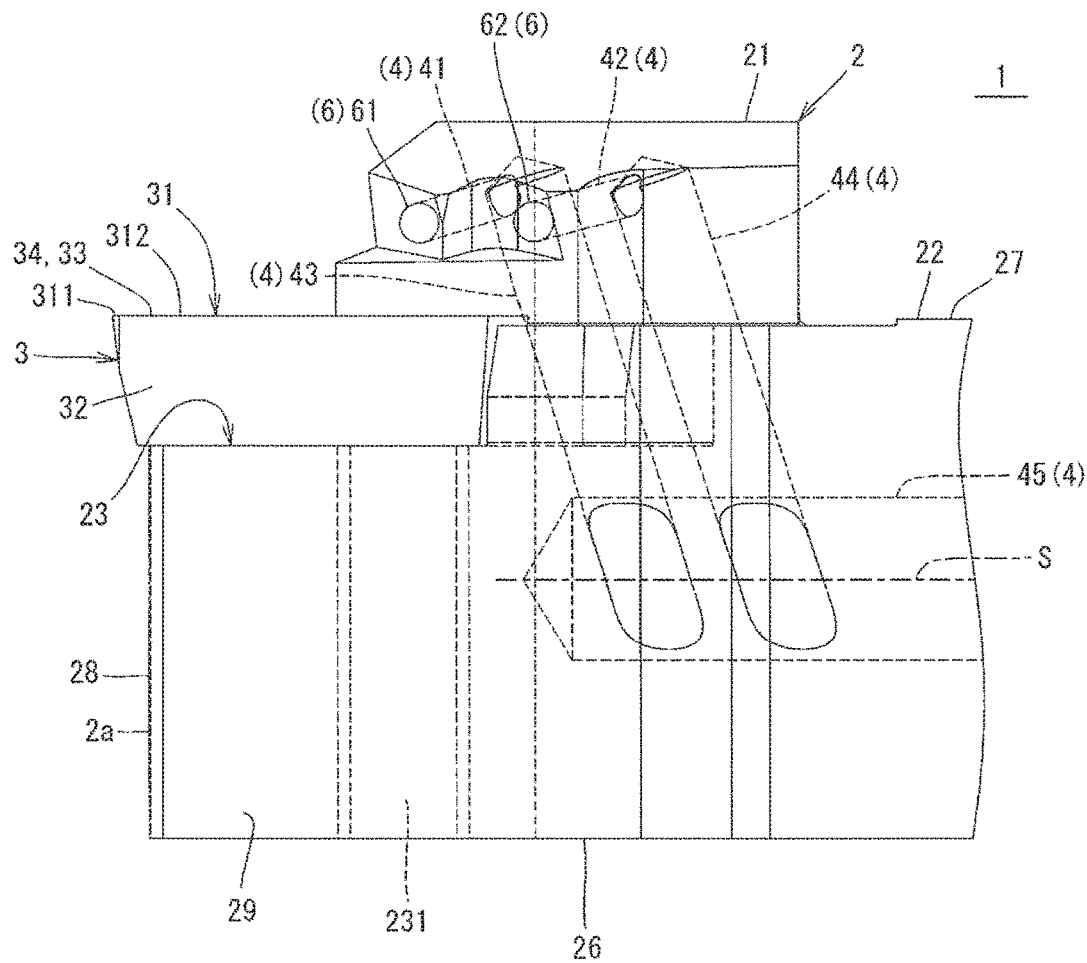
FIG. 3 is an enlarged view at a side of a first end of the cutting tool illustrated in FIG. 2.
Figure 10:
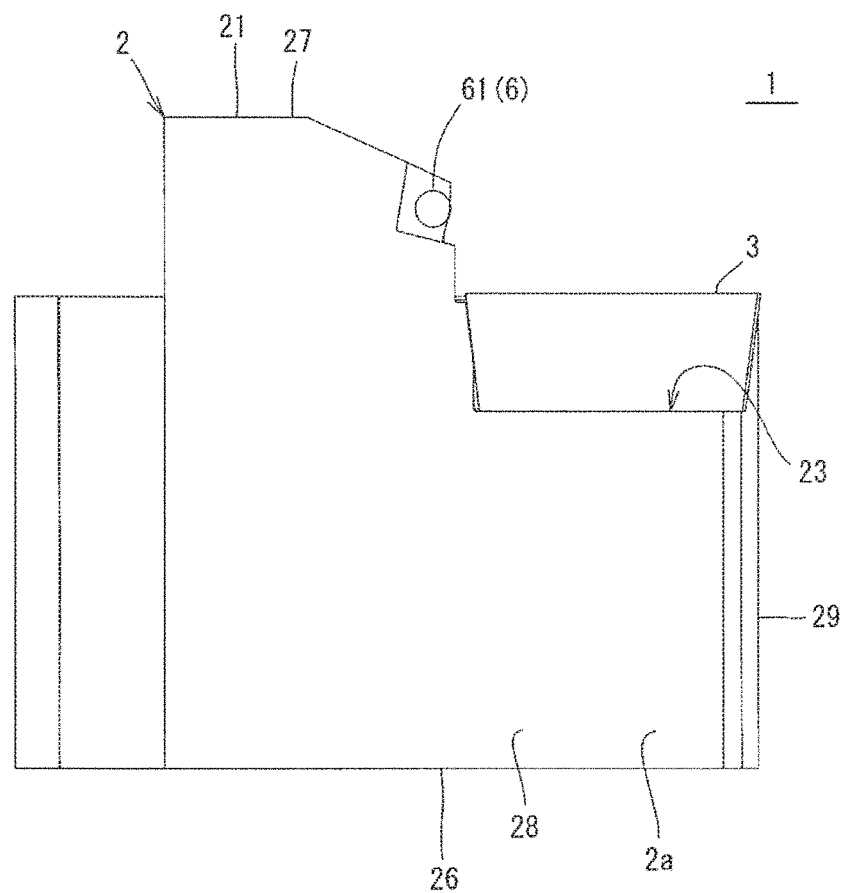
FIG. 10 is a front view enlargedly illustrating the first end of the cutting tool illustrated in FIG. 1.

The holder 2 may include a pocket 23 located at a side of the first end 2a in a non-limiting embodiment as illustrated in FIGS. 3 and 10. The pocket 23 may correspond to a portion at which the insert 3 is located and which is a recessed portion in the head 21. More specifically, the pocket 23 may be recessedly provided so as to open into an upper surface 27, an end surface 28 at a side of the first end 2a and a side surface 29 in the holder 2 in a non-limiting embodiment. The pocket 23 may include a screw hole 231 engageable with a screw 7 described later. The term "the upper surface 27" may be used for the sake of convenience and may not indicate upper and lower directions. For example, the upper surface 27 need not be a surface directed upward when using the cutting tool 1. This may be also true for a lower surface 26 described later.

For example, steel, cast iron, and aluminum alloy may be usable as a material for the holder 2.

Dimensions of the holder 2 may be settable to the following values. A length of the holder 2 in a direction parallel to a longitudinal direction "a" of the holder 2 illustrated in FIG. 1 may be, for example, 60-200 mm. A width of the holder 2 in a direction vertical to the longitudinal direction "a" may be, for example, 6-50 mm.

Figure 7:
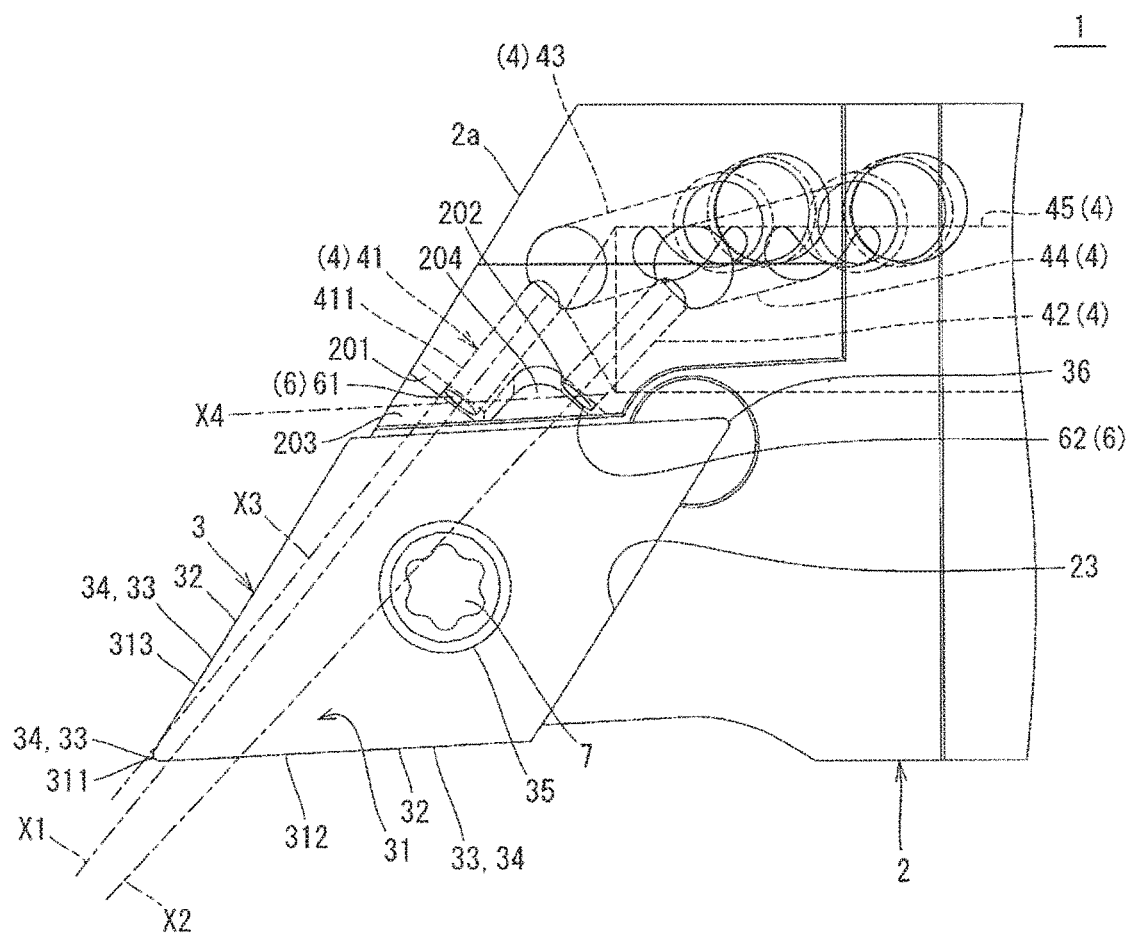
FIG. 7 is an enlarged view at a side of the first end of the cutting tool illustrated in FIG. 4.

The insert 3 may be located at a side of the first end 2a of the holder 2. The insert 3 may have a plate shape and may include a first surface 31, a second surface 32 and a cutting edge 33 in a non-limiting embodiment as illustrated in FIGS. 3 and 7.

At least a part of the first surface 31 may be capable of functioning as a rake surface along which chips flow during a cutting process. The first surface 31 may include a corner 311 and a first side 312 extending from the corner 311 toward a side of the second end 2b. Alternatively, the first surface 31 may further include a second side 313 extending from the corner 311.

The first surface 31 may have a quadrangular shape in a non-limiting embodiment. More specifically, the first surface 31 may have an approximately rhombus shape, one side of which is the first side 312 in a non-limiting embodiment. The first side 312 may have the same length as the second side 313. The term "quadrangular shape" need not be a strict quadrangular shape as long as it has an approximately quadrangular shape. The shape of the first surface 31 is not limited to the quadrangular shape, but may have other shape. Examples of the other shape may include triangular, pentagonal, hexagonal and octagonal shapes.

At least a part of the second surface 32 may be capable of functioning as a flank surface during the cutting process. The second surface 32 may be adjacent to the first surface 31. The second surface 32 may connect to the first surface 31 in a non-limiting embodiment. The second surface 32 may be composed of four surface regions correspondingly to four sides of the quadrangular first surface 31 in a non-limiting embodiment.

The cutting edge 33 may be located at least at a ridge part 34 where the first surface 31 intersects with the second surface 32. More specifically, the cutting edge 33 may be located at least at a part of the corner 311 and the first side 312 in the ridge part 34. The cutting edge 33 may be located on the whole of the corner 311 and most of the first side 312 in the ridge part 34 in a non-limiting embodiment. Alternatively, the cutting edge 33 may further be located at least at a part of the second side 313 in the ridge part 34. The insert 3 may be located at the pocket 23 in a state in which the cutting edge 33 is protruded at a side of the first end 2a of the holder 2.

The insert 3 may include a through hole 35 extending through the insert 3 in a thickness direction thereof in a non-limiting embodiment. The through hole 35 may be a portion that permits insertion of a fixing member for fixing the insert 3 to the holder 2. The fixing member may be a screw 7 in a non-limiting embodiment. That is, the cutting tool 1 may include the screw 7 as the fixing member. The insert 2 may be fixable to the holder 3 by inserting the screw 7 into the through hole 35 and a screw hole 231 of the pocket 23 in this order, and by fastening them together. The fixing member may be a different fixing member instead of the screw 7. Examples of the different fixing member may include a clamp member. The insert 3 may not include the through hole 35 depending on a fixing method for the fixing member.

For example, cemented carbide and cermet may be usable as a material of the insert 3. Examples of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co. The cermet may be a sintered composite material obtainable by compositing metal into a ceramic ingredient. Examples of the cermet may include ones which are composed mainly of a titanium compound, such as titanium carbide (TiC) and titanium nitride (TiN).

A surface of the insert 3 may be coated with a coating film. Examples of composition of the coating film may include titanium carbide (TiC), titanium nitride (TiN), titanium carbonitride (TiCN) and alumina ($Al_2O_3$). For example, a chemical vapor deposition (CVD) method and a physical vapor deposition (PVD) method may be usable as a method of depositing the coating film.

Dimensions of the insert 3 may be settable to, for example, the following values. A length of one side in the quadrangular first subsurface 31 may be, for example, 3-54 mm. A thickness of the insert 3 may be, for example, 1-10 mm. The insert 3 may be either one of positive-type and negative-type ones.

Figure 2:
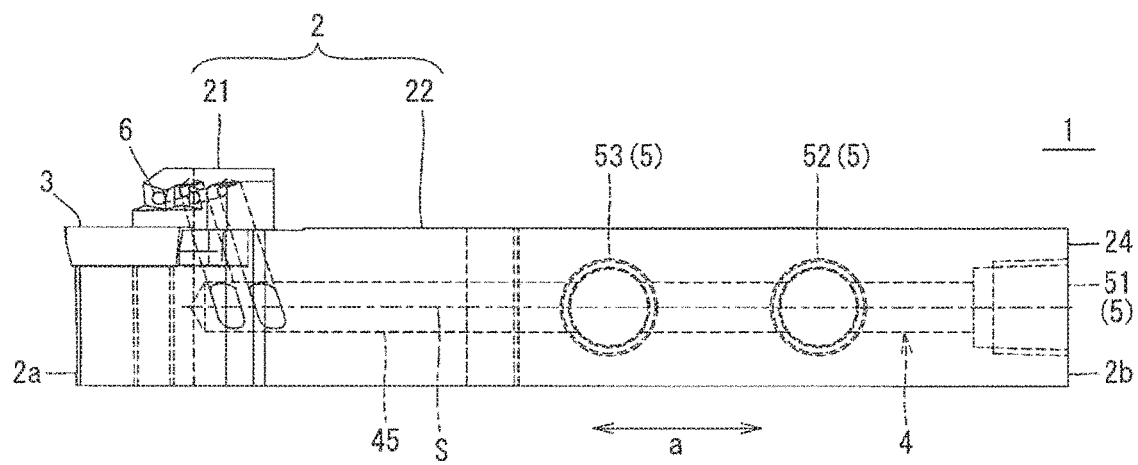
Figure 4:
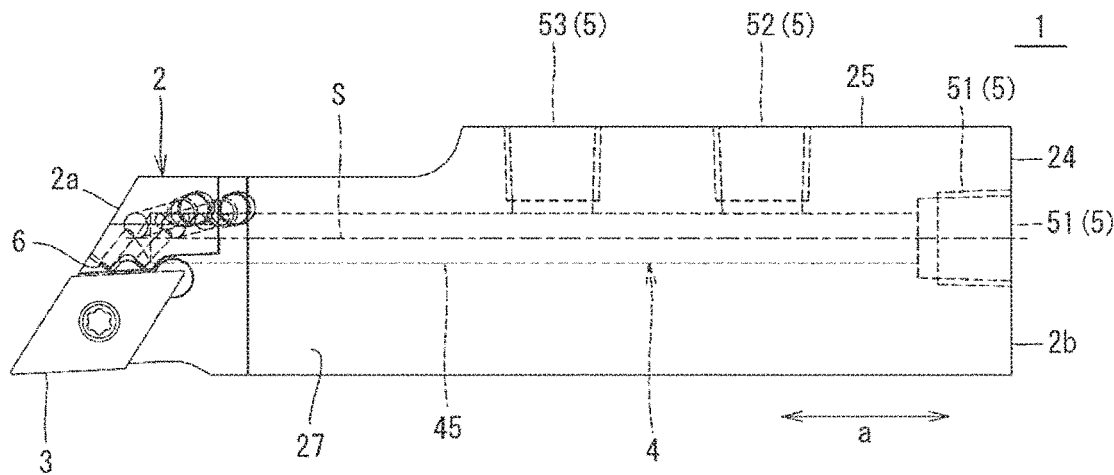
FIG. 4 is a top view of the cutting tool illustrated in FIG. 1.

As illustrated in FIGS. 2 and 4, the holder 2 may include a flow path 4. The flow path 4 may be located inside the holder 3 and serves as a part that permits a flow of a coolant. Examples of the coolant may include water-insoluble cutting fluids and water-soluble cutting fluids. Examples of the water-insoluble cutting fluids may include oil-based cutting fluids, inert extreme pressure-based cutting fluids and active extreme pressure-based cutting fluids. Examples of the water-soluble cutting fluids may include emulsion-type, soluble-type and solution-type cutting fluids. Alternatively, the coolant may be gases, such as inert gas, instead of liquid.

The flow path 4 may include an inflow port 5 and an outflow port 6.

The inflow port 5 may serve as a portion that permits an inflow of the coolant supplied from outside into the flow path 4. At least one or a plurality of the inflow ports 5 may be used. If there are a plurality of the inflow ports 5, the inflow port 5 to be used may be selectable depending on a machine tool. The inflow port 5 that may be unnecessary to use may be closed by a detachable sealing member. The flow path 4 may include three inflow ports 5, namely, a first inflow port 51, a second inflow port 52 and a third inflow port 53 in a non-limiting embodiment. The first inflow port 51 may open into an end surface 24 at a side of the second end 2b of the holder 2. The second inflow port 52 and the third inflow port 53 may open into one side surface 25 of the holder 2 in order from a side of the second end 2b. The number of the inflow ports 5 is not limited to three. The positions where the inflow ports 5 open are not limited to the above-mentioned positions.

The outflow port 6 may serve as a portion that permits an outflow of the coolant toward the insert 3. The flow path 4 may include a first outflow port 61 and a second outflow port 62 as the outflow port 6 as illustrated in FIG. 3. Specifically, the flow path 4 may include a first flow path 41 and a second flow path 42. The first flow path 41 may include the first outflow port 61 as the outflow port 6. The second flow path 42 may include the second outflow port 62 as the outflow port 6. The first outflow port 61 may be located at a side of the first end 2a, and the second outflow port 62 may be located closer to a side of the second end 2b than the first outflow port 61.

The first flow path 41 may be located above the insert 3. The second flow path 42 may be located above the insert 3. The phrase that "the first flow path 41 and the second flow path 42 are located above the insert 3" can be evaluated, for example, on the basis of the lower surface 26 of the holder 2 or a central axis S of the holder 2 described later. That is, the evaluation can be made by regarding a side of the insert 3 as an upper side and a side of the lower surface 26 of the holder 2 as a lower side in a direction vertical to the above basis. More specifically, for example, the fact that the first flow path 41 and the second flow path 42 are located above the insert 3 may denote that the first flow path 41 and the second flow path 42 are located above the insert 3 in a side view of the holder 2 as illustrated in FIG. 3. Evaluations of "upper side" and "lower side" described later can be made in the same manner as the above evaluation.

In cases where the insert 3 includes the through hole 35, "the upper side" and "the lower side" may be evaluated on the basis of a central axis of the through hole 35 instead of the lower surface 26 of the holder 2. Specifically, the direction vertical to the lower surface 26 of the holder 2 may be replaced with a direction along the central axis of the through hole 35. In this case, a direction which extends along the central axis and is directed outward from the insert 3 at a side of the first surface 31 may be referred to as "the upper side," and a direction which extends along the central axis and is directed outward from the insert 3 at a side opposite to the first surface 31 may be referred to as "the lower side."

The first flow path 41 may extend along a first central axis S1. The second flow path 42 may extend along a second central axis S2. The first central axis S1 may be obtainable, for example, by regarding that a center of an inner diameter at a side of the first outflow port 61 of the first flow path 41 is continuous. Similarly, the second central axis S2 may be obtainable, for example, by regarding that a center of an inner diameter at a side of the second outflow port 62 of the second flow path 42 is continuous. Both the side of the first outflow port 61 of the first flow path 41 and the side of the second outflow port 62 of the second flow path 42 may extend in a straight line shape. The first flow path 41 and the second flow path 42 entirely may extend in the straight line shape in a non-limiting embodiment.

Figure 8:
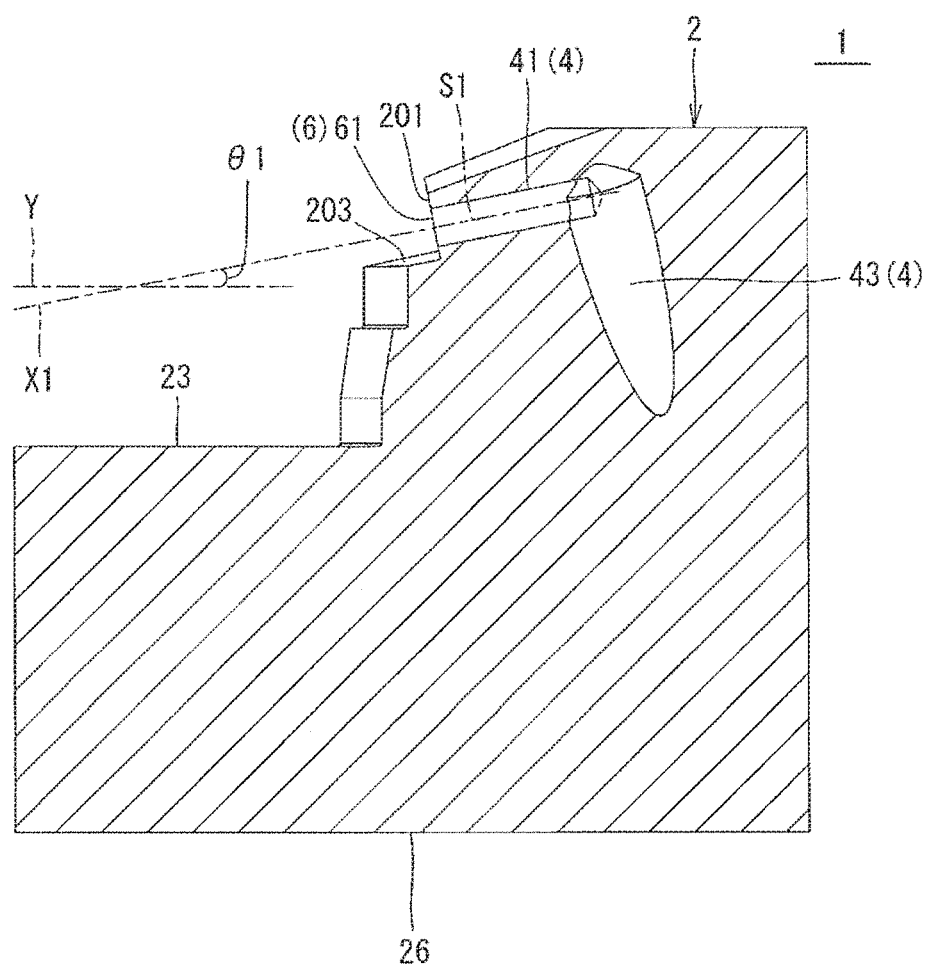
FIG. 8 is an enlarged sectional view taken along line A-A in a state obtained by removing the cutting insert in FIG. 6.
Figure 9:
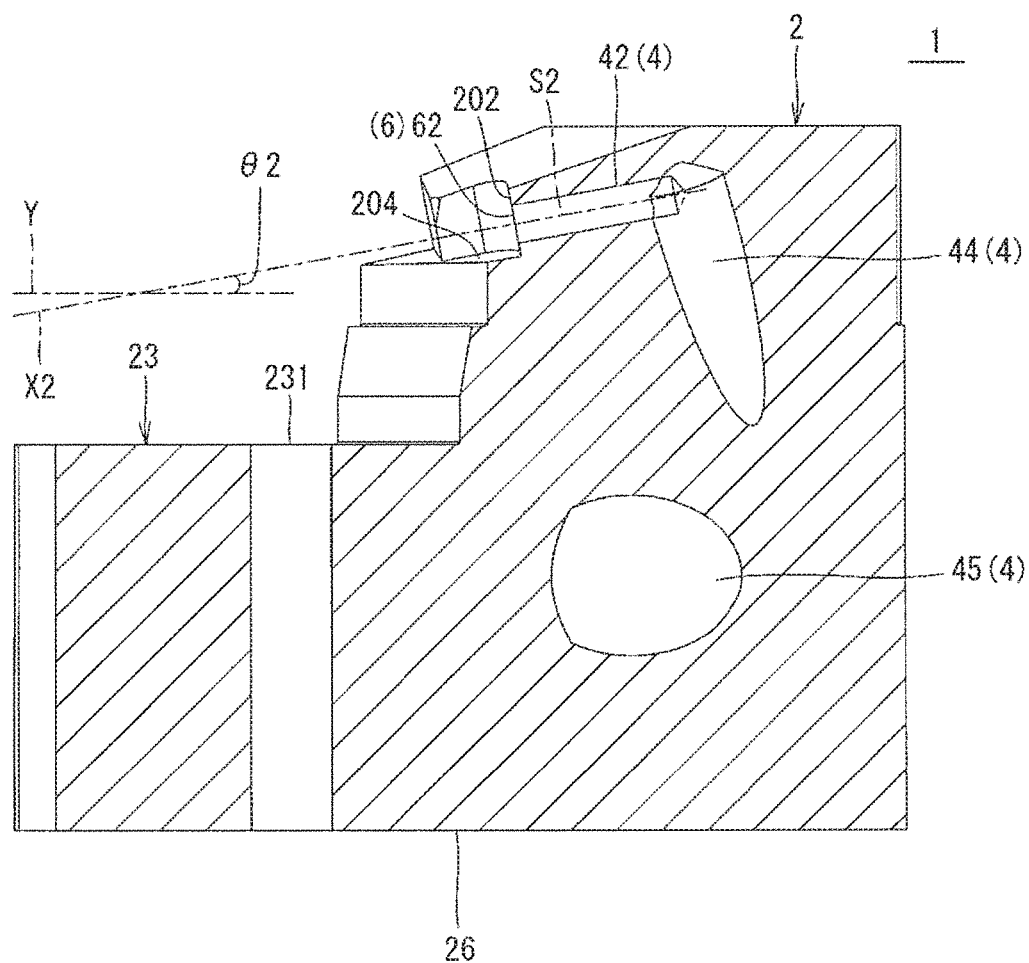
FIG. 9 is an enlarged sectional view taken along line B-B in a state obtained by removing the cutting insert in FIG. 6.

A line obtained by extending the first central axis S1 outward of the holder 2 from the first outflow port 61 may be referred to as a first imaginary line X1 as illustrated in FIG. 8. A line obtained by extending the second central axis S2 outward of the holder 2 from the second outflow port 62 may be referred to as a second imaginary line X2 as illustrated in FIG. 9. The first imaginary line X1 may correspond to a flow direction of a fluid flowing out of the first outflow port 61. Similarly, the second imaginary line X2 may correspond to a flow direction of the fluid flowing out of the second outflow port 62.

The first imaginary line X1 may be inclined downward as going away from the first outflow port 61 as illustrated in FIG. 8. The second imaginary line X2 may be inclined downward as going away from the second outflow port 62 as illustrated in FIG. 9. In other words, the first imaginary line X1 and the second imaginary line X2 may be inclined toward the insert 3 as going away from the corresponding outflow ports 61 and 62, respectively.

A first angle θ1 may be equal to a second angle θ2 in the case that the first angle θ1 is an inclination angle of the first imaginary line X1 relative to the first surface 31, and the second angle θ2 is an inclination angle of the second imaginary line X2 relative to the first surface 31 as illustrated in FIGS. 8 and 9. The first angle θ1 may be substantially equal to the second angle θ2. There may be a slight difference between both angles. Specifically, there may be a difference of, for example, ±3° between both angle values. The first angle θ1 and the second angle θ2 may be, for example, 5-30°. The first angle θ1 and the second angle θ2 may be evaluated, for example, on the basis of an arbitrary line Y parallel to the lower surface 26 of the holder 2 or the central axis S of the holder 2. For the purpose of a simple evaluation, dimensions of the first angle θ1 and the second angle θ2 may be evaluated in a front view illustrated in FIG. 10.

Figure 5:
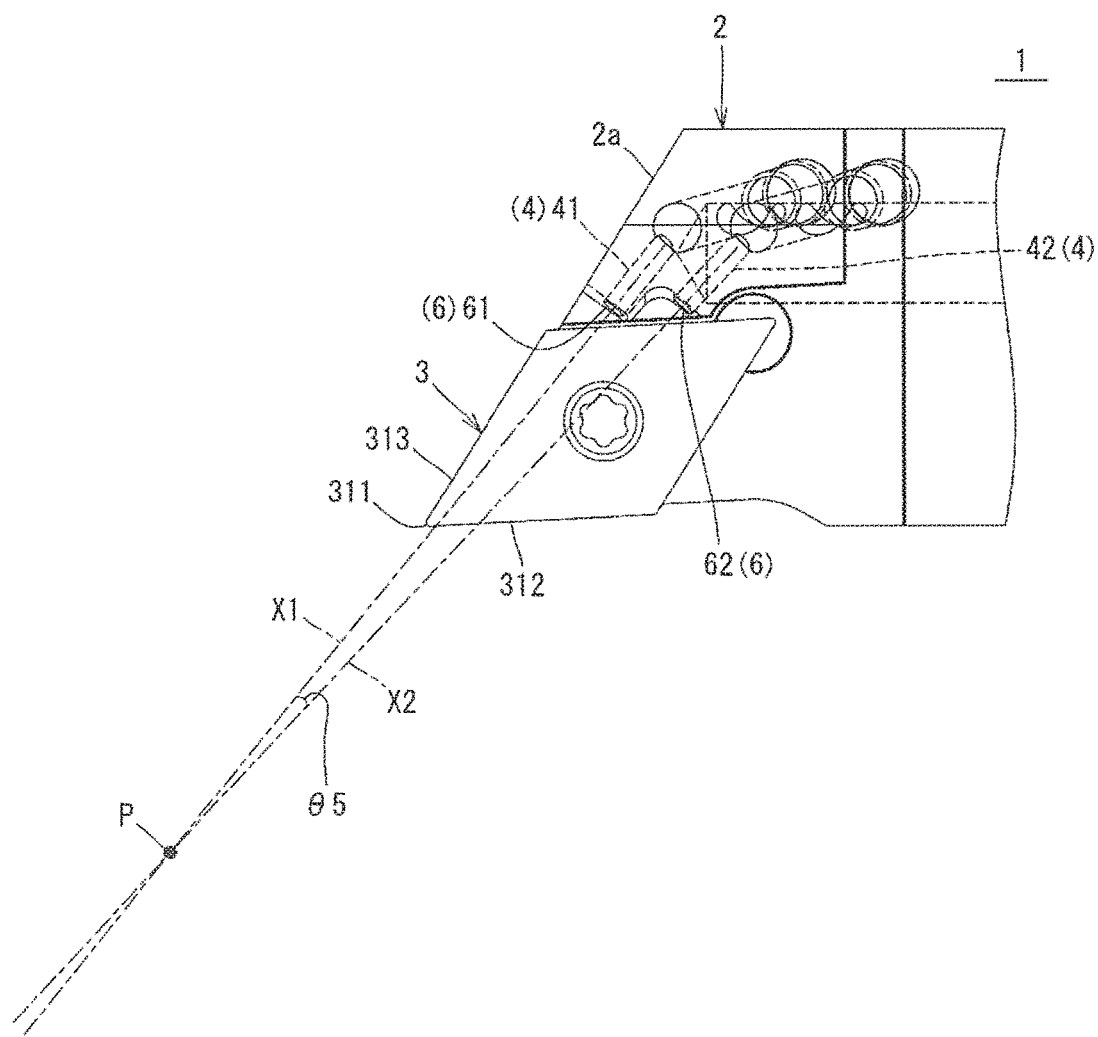
FIG. 5 is an enlarged view at a side of the first end of the cutting tool illustrated in FIG. 4.

As illustrated in FIG. 5, an intersection P of the first imaginary line X1 and the second imaginary line X2 may be located outside of the insert 3 in a top view.

Figure 6:
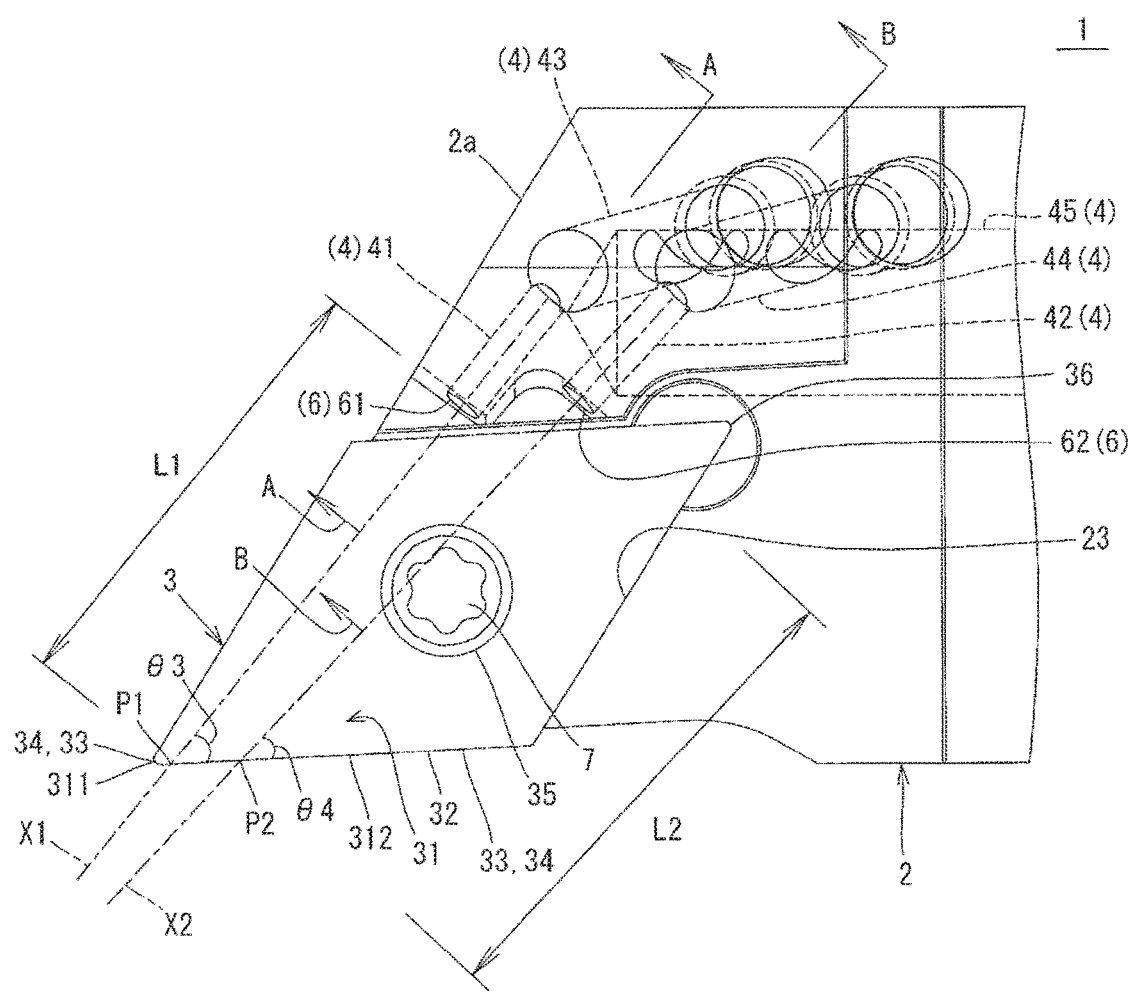
FIG. 6 is an enlarged view at a side of the first end of the cutting tool illustrated in FIG. 4.

As illustrated in FIG. 6, the first imaginary line X1 may intersect with the corner 311 or the first side 312 in a top view. The first imaginary line X1 may intersect with the first side 312 in a non-limiting embodiment. The second imaginary line X2 may intersect with the first side 312 at a side closer to the second end 2b than the first imaginary line X1.

With the above configuration, the following effects may be obtainable. In the above configuration, two coolant injections may be designed not to intersect at the insert 3 because the intersection P is located outside of the insert 3, and the two coolant injections may have an identical injection angle because the first angle θ1 is the same as the second angle θ2. This configuration may ensure that the two coolant injections individually come into direct contact with chips at the same angle. Generated chips can therefore be stably curled by the two coolant injections, thus leading to good chip discharge performance. The cutting tool 1 may be consequently capable of having both the good chip discharge performance and good cooling effect.

As illustrated in FIG. 6, a distance L1 from the first outflow port 61 to an intersection P1 of the first imaginary line X1 and the ridge part 34 may be smaller than a distance L2 from the second outflow port 62 to an intersection P2 of the second imaginary line X2 and the ridge part 34. If satisfying this configuration, the distance L1 that relates to a supply of a coolant toward the vicinity of the corner 311 may be relatively small, and the distance L2 that relates to the supply of the coolant toward the first side 312 may be relatively great. With this configuration, it may be possible to increase accuracy of injection at the vicinity of the corner 311 (low and middle depths of cut), and it may be also possible to diffuse the coolant at the first side 312 (middle and higher depths of cut). This may lead to good cooling effect in a wider range of cutting conditions. The distance L1 may be, for example, 3-30 mm. The distance L2 may be, for example, 4-31 mm.

The first outflow port 61 and the second outflow port 62 may be located closer to a side of the first end 2a than an end portion 36 at a side of the second end 2b in the insert 3. If satisfying this configuration, the distances L1 and L32 may become smaller, thus leading to improvements in chip discharge performance and cooling effect.

A height of the first outflow port 61 from the first surface 31 may be equivalent to a height of the second outflow port 62 from the first surface 31. If satisfying this configuration, injection heights of the two coolant injections can be made equivalent. This, together with the fact that the first angle θ1 is equal to the second angle θ2, may ensure that the two coolant injections individually come into contact with chips at an identical height position and an identical angle. It may be therefore possible to stably curl the generated chips by the two coolant injections, thus leading to the good chip discharge performance. The heights of the first outflow port 61 and the second outflow port 62 may be substantially the same. There may be a slight difference between the two heights. Specifically, there may be a difference of ±3 mm between the two height values.

The height of the first outflow port 61 and the height of the second outflow port 62 may be evaluated, for example, on the basis of the lower surface 26 of the holder 2 or the central axis S of the holder 2. Specifically, the holder 2 may include the flat lower surface 26 in a non-limiting embodiment. With this configuration, dimensions from the lower surface 26 of the holder 2 to a center of the first outflow port 61 and a center of the second outflow port 62 may be respectively evaluated as heights of the first outflow port 61 and the second outflow port 62. If the central axis S of the holder 2 is used as a standard, dimensions from the central axis S of the holder 2 to the centers of the first outflow port 61 and the second outflow port 62 may be respectively evaluated as heights of the first outflow port 61 and the second outflow port 62. The central axis S of the holder 2 may be a central axis of the shank 22 in a non-limiting embodiment. The central axis of the shank 22 may be an axis extending both ends of the shank in a direction parallel to the longitudinal direction "a" of the holder 2.

As illustrated in FIG. 7, a straight line X4 connecting the first outflow port 61 and the second outflow port 62 may be parallel to the first side 312 in a top view. If satisfying this configuration, the first outflow port 61 and the second outflow port 62 may be located parallel to the first side 312 at which a part of the cutting edge 33 is located. It may be therefore possible to efficiently inject the coolant to chips at the identical angle from the first flow path 41 and the second flow path 42. Hence, the chips can stably be curled to improve the chip discharge performance.

The straight line X4 may be a straight line passing through centers of the first outflow port 61 and the second outflow port 62. The straight line X4 may be substantially parallel to the first side 312. The straight line X4 may include, for example, an error of approximately ±3° relative to the first side 312.

A flow velocity in the second outflow port 62 may be higher than a flow velocity in the first outflow port 61. If satisfying this configuration, a flow velocity of the coolant injection from the second outflow port 62, which is intended to diffuse the coolant in the vicinity of the first side 312, may become relatively high. This may contribute to enhancing the effect of bringing the coolant injections respectively injected from the first outflow port 61 and the second outflow port 62 into a stable contact with the chips, thereby improving the chip discharge performance.

The flow velocity in the first outflow port 61 may denote a velocity of a fluid flowing from the first outflow port 61. Similarly, the flow velocity in the second outflow port 62 may denote a velocity of a fluid flowing from the second outflow port 62. More specifically, for example, the flow velocity in the first outflow port 61 may denote an initial velocity of the fluid flowing from the first outflow port 61, and the flow velocity in the second outflow port 62 may denote an initial velocity of the fluid flowing from the second outflow port 62. The flow velocity in the first outflow port 61 may be, for example, 20-40 m/s. The flow velocity in the second outflow port 62 may be, for example, 30-50 m/s. Adjustments of the flow velocities may be made, for example, by adjusting a pressure loss in each of the first flow path 41 and the second flow path 42.

As illustrated in FIG. 6, a third angle θ3 formed by the first imaginary line X1 and the first side 312 may be greater than a fourth angle θ4 formed by the second imaginary line X2 and the first side 312 in a top view. If satisfying this configuration, arrangement may be made so that the coolant injection from the second outflow port 62 located at the side closer to the second end 2b than the first outflow port 61 relatively goes toward a side of the first end 2a. This may make it easier for generated chips to be pushed out to the side of the first end 2a. This may lead to further improvement in chip discharge performance. The third angle θ3 may be, for example, 16-86°. The fourth angle θ4 may be, for example, 15-85°.

As illustrated in FIG. 5, a fifth angle θ5 formed by the first imaginary line X1 and the second imaginary line X2 may be smaller than each of the third angle θ3 and the fourth angle θ4 in a top view. If satisfying this configuration, there may be a small counterbalance between a force to push out chips by the coolant injection from the first outflow port 61 and a force to push out chips by the coolant injection from the second outflow port 62. It may be therefore possible to efficiently push out the generated chips toward the side of the first end 2a. The fifth angle θ5 may be, for example, 1-15°.

As illustrated in FIG. 7, a third imaginary line X3 may intersect with the second side 313 if the third imaginary line X3 is a line obtained by extending an inner periphery 411 at a side of the first end 2a in the first flow path 41 from the first outflow port 61 toward outside of the holder 2. If satisfying this configuration, it may be possible to inject the coolant to chips generated in the vicinity of the corner 311 at a side of the second side 313.

The flow path 4 may further include a third flow path 43, a fourth flow path 44 and a fifth flow path 45 in a non-limiting embodiment as illustrated in FIG. 3. The third flow path 43 may connect to the first flow path 41 and may extend downward from the first flow path 41. The fourth flow path 44 may connect to the second flow path 42 and may extend downward from the second flow path 42. The fifth flow path 45 may connect to the inflow port 5 and may extend from a side of the second end 2b toward a side of the first end 2a as illustrated in FIGS. 2 and 4. The third flow path 43 may connect to the fifth flow path 45, and the fourth flow path 44 may connect to the fifth flow path 45 at a side closer to the second end 2b than the third flow path 43 as illustrated in FIG. 3.

There is no particular limitation on the shape of the flow path 4 as long as the coolant is flowable therethrough. The shape of the flow path 4 in the cross section orthogonal to the flow direction of the coolant may be a circular shape in a non-limiting embodiment. An inner diameter of the flow path 4 may be, for example, 0.1-10 mm. More specifically, an inner diameter of the first flow path 41 may be, for example, 0.1-2 mm. An inner diameter of the second flow path 42 may be, for example, 0.1-2 mm. An inner diameter of the third flow path 43 may be, for example, 0.5-5 mm. An inner diameter of the fourth flow path 44 may be, for example, 0.5-5 mm. An inner diameter of the fifth flow path 45 may be, for example, 1-10 mm. The inner diameter of the flow path 4 may decrease stepwise as going from the inflow port 5 toward the outflow port 6 in a non-limiting embodiment.

The flow path 4 may be formable, for example, by a drilling process using a drill or the like. A part of a hole formed by the drilling process, which does not function as the flow path 4, may be closed by a sealing member in order to prevent leakage of the coolant. Examples of the sealing member may include solder, resins and screw members.

As illustrated in FIGS. 8 and 9, the holder 2 may include a first wall surface 201, which is vertical to the first central axis S1, and into which the first outflow port 61 opens, and a second wall surface 202, which is vertical to the second central axis S2, and into which the second outflow port 62 opens. If satisfying this configuration, the fluid may be uniformly injected along the central axes S1 and S2 and around the central axes S1 and S2 in the outflow ports 61 and 62, thereby making it easier for the fluid to accurately reach target positions (the corner 33 or the first side 32). This may lead to improvements in chip discharge performance and cooling effect.

The first wall surface 201 may be substantially vertical to the first central axis S1. For example, the first wall surface 201 may include an error of approximately ±2° relative to the first central axis S1. Similarly, the second wall surface 202 may be substantially vertical to the second central axis S2. For example, the second wall surface 202 may include an error of approximately ±2° relative to the second central axis S2.

Alternatively, the holder 2 may include a first surface 203 which is parallel to the first central axis S1 and connects to the first wall surface 201, and a second surface 204 which is parallel to the second central axis S2 and connects to the second wall surface 202 as illustrated in FIGS. 8 and 9. If satisfying this configuration, a course of the fluid injected from each of the outflow ports 61 and 62 can be guided in a desired direction, and it may become easier for the fluid to accurately reach the target position. This therefore may lead to improvements in chip discharge performance and cooling effect.

The first surface 203 may be substantially parallel to the first central axis S1. For example, the first surface 203 may include an error of approximately ±2° relative to the first central axis S1. Similarly, the second surface 204 may be substantially parallel to the second central axis S2. For example, the second surface 204 may include an error of approximately ±2° relative to the second central axis S2.

As illustrated in FIG. 5, the intersection P of the first imaginary line X1 and the second imaginary line X2 may be further away from the second end 2b of the holder 2 than the first end 2a of the holder 2 in an extending direction of the holder 2 (the longitudinal direction "a"). If satisfying this configuration, the generated chips can be easily stably pushed out to a side of the first end 2a.

Figure 11:
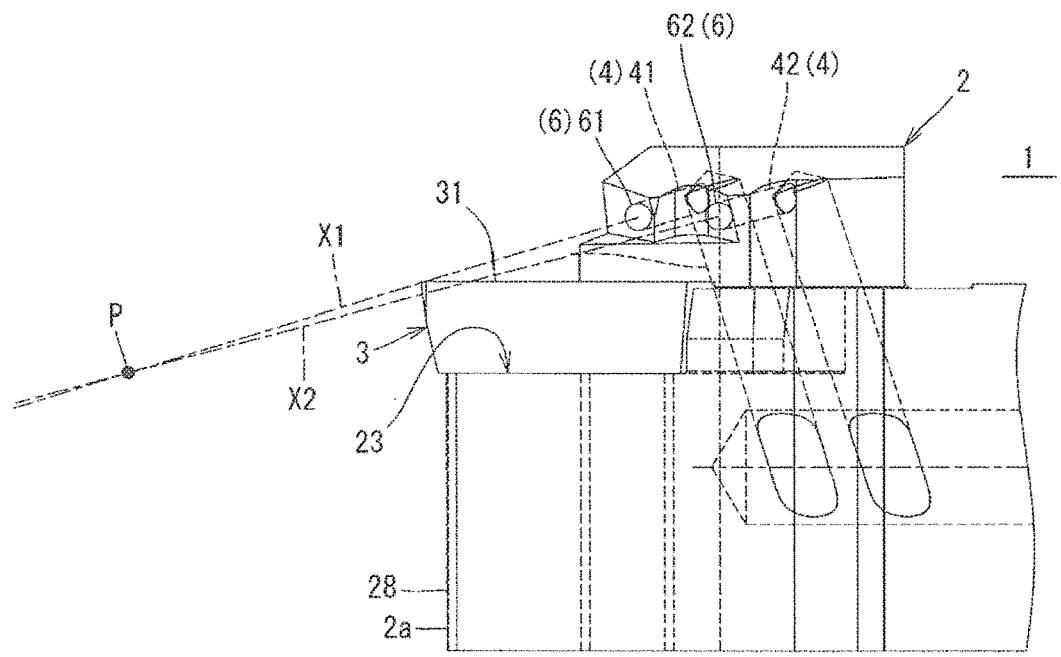
FIG. 11 is an enlarged view at a side of the first end of the cutting tool illustrated in FIG. 2.

As illustrated in FIG. 11, the intersection P of the first imaginary line X1 and the second imaginary line X2 may be located below the first surface 31. The coolant injection may come into contact with the chips in above the insert 3. In cases where the intersection P is located as described above, even if a flow direction of the chips pushed out to the intersection P by the coolant becomes unstable, the chips pushed out to the intersection P may be less likely to affect the above contact. This may lead to improvement in chip discharge performance.

<Method of Manufacturing Machined Product>

Methods of manufacturing a machined product in various non-limiting embodiments of the present disclosure may be described in detail below with reference to FIGS. 12 to 14.

Figure 12:
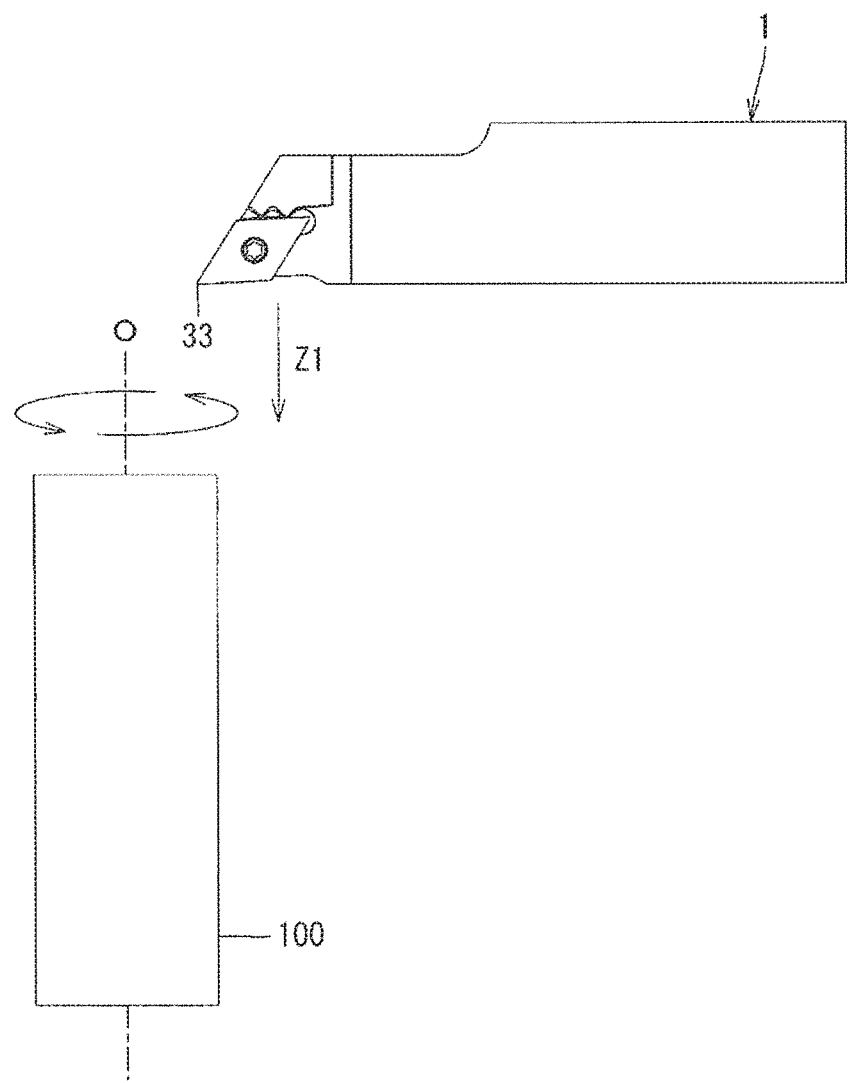
FIG. 12 is a schematic diagram illustrating a step in a method of manufacturing a machined product in a non-limiting embodiment of the present disclosure.
Figure 13:
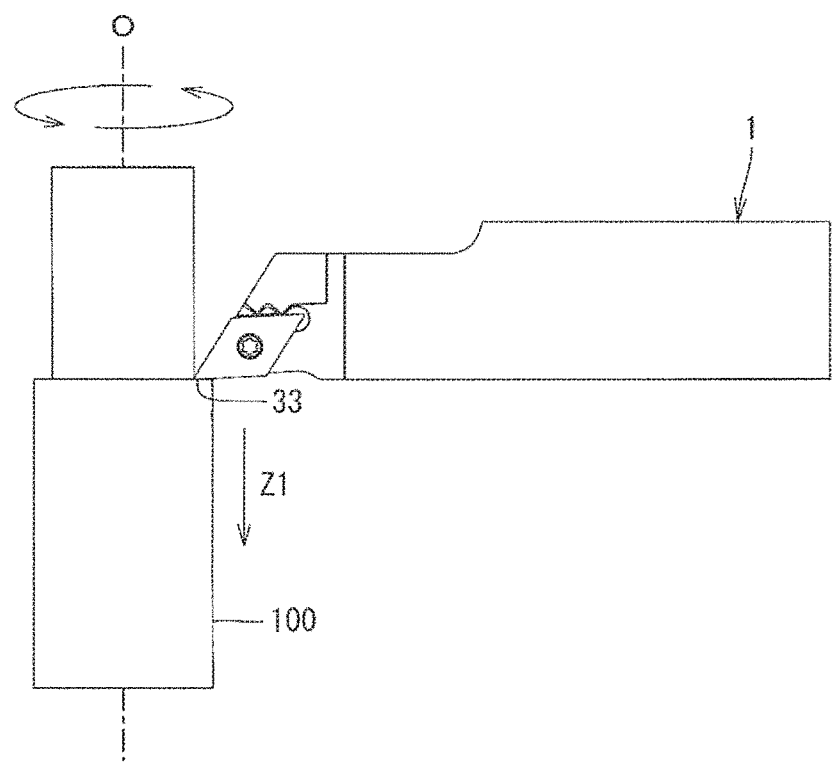
FIG. 13 is a schematic diagram illustrating a step in the method of manufacturing a machined product in a non-limiting embodiment of the present disclosure.
Figure 14:
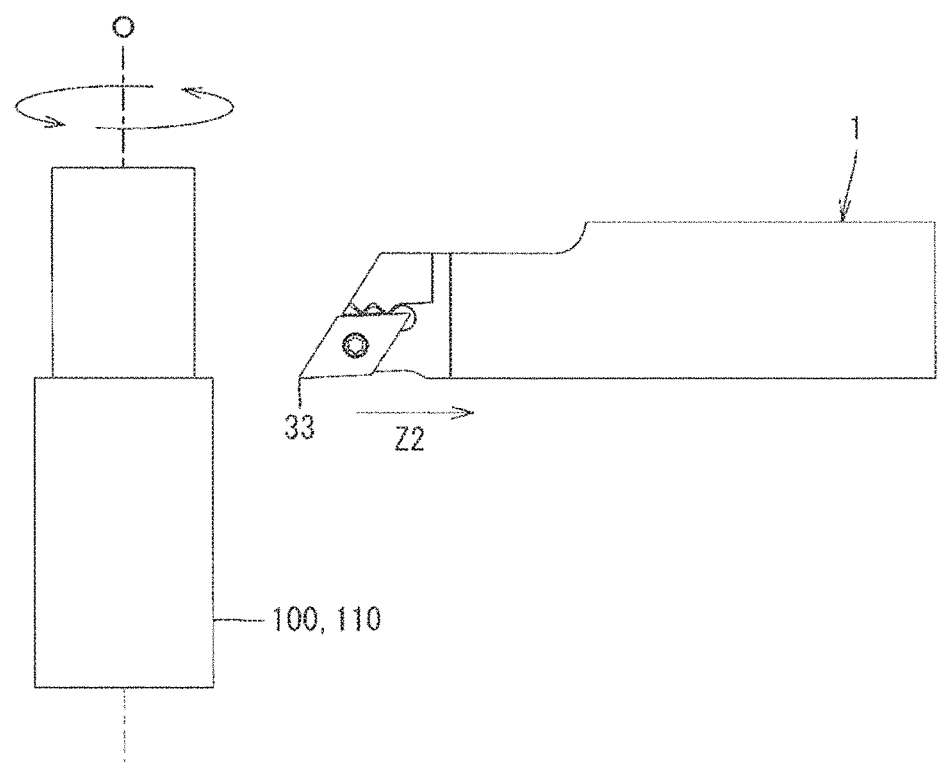
FIG. 14 is a schematic diagram illustrating a step in the method of manufacturing a machined product in a non-limiting embodiment of the present disclosure.

The method of manufacturing a machined product in a non-limiting embodiment may include the following steps of:

(1) rotating a workpiece 100 as illustrated in FIG. 12;

(2) bringing the cutting tool 1 into contact with the workpiece 100 being rotated as illustrated in in FIG. 13; and (3) separating the cutting tool 1 from the workpiece 100 as illustrated in FIG. 14.

Specifically, the workpiece 100 may be first rotated on the basis of a rotation axis O as illustrated in FIG. 12. Examples of material of the workpiece 100 may include carbon steel, alloy steel, stainless steel, cast iron and nonferrous metals.

Subsequently, the cutting tool 1 may be relatively brought near the workpiece 100 being rotated by moving the cutting tool 1 in an arrowed direction Z1.

The workpiece 100 may be then cut out by bringing the cutting edge 33 of the cutting tool 1 into contact with the workpiece 100 as illustrated in FIG. 13. Here, the workpiece 100 may be cut out while causing the coolant to flow out of the first outflow port 61 and the second outflow port 62.

Finally, the cutting tool 1 may be kept relatively far away from the workpiece 100 to obtain a machined product 110 by moving the cutting tool 1 in an arrowed direction Z2 as illustrated in FIG. 14.

With the method of manufacturing a machined product in a non-limiting embodiment, the use of the cutting tool 1 makes it possible to carry out a cutting process in a wide range of cutting conditions. It may be consequently possible to obtain the machined product 110 having a highly accurate machined surface.

Although the machined product 110 may be obtained by moving the cutting tool 1 in a non-limiting embodiment, there is no intention of limiting thereto. For example, the workpiece 100 may be brought near the cutting tool 1 in the step (1). Similarly, the workpiece 100 may be kept away from the cutting tool 1 in the step (3). If it is desired to continue the cutting process, bringing the cutting edge 33 into contact with different portions of the workpiece 100 may be repeated, while the workpiece 100 is kept rotating.

While the cutting tools 1 and the methods of manufacturing the machined product 110 in the non-limiting embodiments of the present disclosure have been exemplified above, the present disclosure is not limited to the above non-limiting embodiments. It may be, of course, possible to make any arbitrary ones in so far as they do not depart from the gist of the present disclosure.

For example, even though the cutting tools 1 are the tools for use in the turning process in the above non-limiting embodiments, the cutting tools 1 may be alternatively tools for use in a milling process.

The first flow path 41 may connect to the third flow path 43 and the second flow path 42 may connect to the fourth flow path 44 in the foregoing non-limiting embodiments. In another non-limiting embodiment, the first flow path 41 and the second flow path 42 may connect to a single flow path. In other words, the single flow path may be located between the fifth flow path 45 and both the first flow path 41 and the second flow path 42.

Although the shape of the flow path 4 in the cross section orthogonal to the flow direction of the coolant is the circular shape in the foregoing non-limiting embodiments, the shape of the flow path 4 in the cross section may be alternatively an ellipse shape.

Singular forms "a", "an" and "the" in the entirety of the present disclosure may include plural forms thereof unless clearly indicated not being so from the context.

DESCRIPTION OF THE REFERENCE NUMERALS 1 cutting tool
2 holder
  2a first end
  2b second end
  21 head
  22 shank
  23 pocket
  231 screw hole
  24 end surface
  25 one side surface
  26 lower surface
  27 upper surface
  28 end surface
  29 one side surface
  201 first wall surface
  202 second wall surface
  203 first surface
  204 second surface
4 flow path
  41 first flow path
    411 inner periphery
  42 second flow path
  43 third flow path
  44 fourth flow path
  45 fifth flow path
5 inflow port
  51 first inflow port
  52 second inflow port
  53 third inflow port
6 outflow port
  61 first outflow port
  62 second outflow port
3 cutting insert
  31 first surface
    311 corner
    312 first side
    313 second side
  32 second surface
  33 cutting edge
  34 ridge part
  35 through hole
  36 end portion
7 screw
100 workpiece
110 machined product

What is claimed is:

1. A cutting tool, comprising:
a holder having a shape extending from a first end to a second end; and
a cutting insert located at a side of the first end, wherein the cutting insert comprises:
  a first surface comprising a ridge comprising a corner and a first side extending from the corner toward the second end, and
  a cutting edge located at the ridge;
the holder comprises a flow path comprising:
  a first flow path comprising a first outflow port, being located above the cutting insert, and extending along a first central axis, and
  a second flow path comprising a second outflow port, being located above the cutting insert, and extending along a second central axis;
a straight line obtained by extending the first central axis from the first outflow port out of the holder along the first flow path is referred to as a first imaginary line, and a straight line obtained by extending the second central axis from the second outflow port out of the holder along the second flow path is referred to as a second imaginary line;
the first imaginary line is inclined downward as going away from the first outflow port;
the second imaginary line is inclined downward as going away from the second outflow port;
an intersection of the first imaginary line and the second imaginary line is located outside of the cutting insert in a plan view of the first surface; and
the first imaginary line intersects with the ridge, and the second imaginary line intersects with the first side at a side closer to the second end than the first imaginary line in the plan view; and
in the plan view,
a distance between the first outflow port and an intersection of the first imaginary line at the ridge is referred to as a first distance,
a distance between the second outflow port and an intersection of the second imaginary line at the first side is referred to as a second distance, and
the first distance is smaller than the second distance.

2. The cutting tool according to claim 1, wherein
the cutting insert further comprises a second end portion closest to the second end, and
the first outflow port and the second outflow port are further away from the second end than the second.

3. The cutting tool according to claim 1, wherein
a height of the first outflow port from the first surface is equal to a height of the second outflow port from the first surface.

4. The cutting tool according to claim 1, wherein
a straight line connecting the first outflow port and the second outflow port is parallel to the first side in the plan view.

5. The cutting tool according to claim 1, wherein
a flow velocity in the second outflow port is configured to be higher than a flow velocity in the first outflow port.

6. The cutting tool according to claim 1, wherein, in the plan view,
an angle formed by the first imaginary line and the first side is referred to as a third angle, and
an angle formed by the second imaginary line and the first side is referred to as a fourth angle, and
the third angle is greater than the fourth angle.

7. The cutting tool according to claim 6, wherein, in the plan view,
an angle formed by the first imaginary line and the second imaginary line is referred to as a fifth angle, and
the fifth angle is smaller than each of the third angle and the fourth angle.

8. The cutting tool according to claim 1, wherein
the ridge further comprises a second side extending from the corner;
a straight line obtained by extending perpendicularly, from a point on a perimeter of the first outflow port closest to the first end, out of the holder and along the first flow path, which is referred to as a third imaginary line; and
the third imaginary line intersects with the second side.

9. The cutting tool according to claim 1, wherein
the intersection of the first imaginary line and the second imaginary line is further away from the second end than the first end in an extending direction of the holder.

10. The cutting tool according to claim 1, wherein
the intersection of the first imaginary line and the second imaginary line is located below the first surface.

11. A method of manufacturing a machined product, comprising:
rotating a workpiece;
bringing the cutting tool according to claim 1 into contact with the workpiece being rotated; and
separating the cutting tool from the workpiece.

12. The cutting tool according to claim 1, wherein
an inclination angle of the first imaginary line relative to the first surface is referred to as a first angle, and an inclination angle of the second imaginary line relative to the first surface is referred to as a second angle, and the first angle is equal to the second angle.

13. A cutting tool, comprising:
a holder having a shape extending from a first end to a second end; and
a cutting insert located at a side of the first end, wherein
the cutting insert comprises:
a first surface comprising a ridge comprising a corner and a first side extending from the corner toward the second end, and
a cutting edge located at the ridge;
the holder comprises a flow path comprising:
a first flow path comprising a first outflow port, being located above the cutting insert, and extending along a first central axis, and
a second flow path comprising a second outflow port, being located above the cutting insert, and extending along a second central axis;
a straight line obtained by extending the first central axis from the first outflow port out of the holder along the first flow path is referred to as a first imaginary line, and a straight line obtained by extending the second central axis from the second outflow port out of the holder along the second flow path is referred to as a second imaginary line;
the first imaginary line is inclined downward as going away from the first outflow port;
the second imaginary line is inclined downward as going away from the second outflow port;
an intersection of the first imaginary line and the second imaginary line is located outside of the cutting insert in a plan view of the first surface;
the first imaginary line intersects with the ridge, and the second imaginary line intersects with the first side at a side closer to the second end than the first imaginary line in the plan view; and
a straight line connecting the first outflow port and the second outflow port is parallel to the first side in the plan view.

14. A method of manufacturing a machined product, comprising:
rotating a workpiece;
bringing the cutting tool according to claim 13 into contact with the workpiece being rotated; and
separating the cutting tool from the workpiece.

* * * * *